(12) United States Patent
Al Seoud et al.

(10) Patent No.: US 11,633,693 B2
(45) Date of Patent: Apr. 25, 2023

(54) FILTRATION IN GAS DEHYDRATION

(71) Applicant: Saudi Arabian Oil Company, Dhahran (SA)

(72) Inventors: Ahmed Al Seoud, Dammam (SA); Saleh R. Al Shaiban, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 140 days.

(21) Appl. No.: 17/164,088

(22) Filed: Feb. 1, 2021

(65) Prior Publication Data

US 2022/0241721 A1    Aug. 4, 2022

(51) Int. Cl.
*B01D 53/26* (2006.01)
*B01D 46/12* (2022.01)
*B01D 53/04* (2006.01)
*B01D 46/00* (2022.01)

(52) U.S. Cl.
CPC ....... *B01D 53/261* (2013.01); *B01D 46/0002* (2013.01); *B01D 46/12* (2013.01); *B01D 53/0446* (2013.01); *B01D 53/0415* (2013.01); *B01D 2201/0415* (2013.01); *B01D 2257/80* (2013.01)

(58) Field of Classification Search
None
See application file for complete search history.

(56) References Cited

U.S. PATENT DOCUMENTS

| | | | |
|---|---|---|---|
| 2,705,054 A | 3/1955 | Swann | |
| 3,942,960 A * | 3/1976 | Girard | B01D 53/0423 96/144 |
| 4,925,557 A | 5/1990 | Ahlberg et al. | |
| 5,664,426 A | 9/1997 | Lu | |
| 7,128,776 B2 | 10/2006 | Schmidt et al. | |
| 8,419,826 B2 | 4/2013 | Carlsson | |
| 2005/0199123 A1 | 9/2005 | Schmidt et al. | |
| 2016/0271543 A1* | 9/2016 | Vincent | B01D 46/71 |

\* cited by examiner

*Primary Examiner* — Philip Y Louie
(74) *Attorney, Agent, or Firm* — Fish & Richardson P.C.

(57) ABSTRACT

A filter for a sorbent regeneration process includes a base, a central rod, support frames, and a filter screen. The central rod is coupled to the base and defines a longitudinal axis of the filter. Each of the support frames are coupled to and protrude radially from the central rod. Each of the support frames are coupled to the base. For each pair of neighboring support frames, the filter includes a triangular support member disposed between the pair of neighboring support frames. Each triangular member is coupled to the central rod and to each of the neighboring support frames. The filter screen surrounds the support frames and is coupled to the support frames and to the base.

19 Claims, 10 Drawing Sheets

FILTRATION IN GAS DEHYDRATION

TECHNICAL FIELD

This disclosure relates to filtration, and in particular, in relation to gas dehydration.

BACKGROUND

Adsorption is a commonly used method for gas dehydration. Adsorption involves the use of a sorbent. As gas flows past the sorbent, water adsorbs to the sorbent. Typically, the amount of adsorbed water increases with operating pressure and decreases with operating temperature. After some time and use, the sorbent is regenerated by heating the sorbent to desorb the water from the sorbent. By regenerating the sorbent, the sorbent can be re-used in the gas dehydration process.

SUMMARY

This disclosure describes technologies relating to filtration, and in particular, in relation to gas dehydration. Certain aspects of the subject matter described can be implemented as a filter for a sorbent regeneration process. The filter includes a base, a central rod, support frames, and a filter screen. The central rod is coupled to the base and defines a longitudinal axis of the filter. Each of the support frames are coupled to and protrude radially from the central rod. Each of the support frames are coupled to the base. For each pair of neighboring support frames, the filter includes a triangular support member disposed between the pair of neighboring support frames. Each triangular member is coupled to the central rod and to each of the neighboring support frames. The filter screen surrounds the support frames and is coupled to the support frames and to the base.

This, and other aspects, can include one or more of the following features.

In some implementations, each of the support frames have a height that is substantially the same as a length of the central rod.

In some implementations, for each pair of neighboring support frames, a first side of the triangular support member is coupled to a first support frame of the pair of neighboring support frames. In some implementations, the first side of the triangular support member has a width that is at least ¾ of a width of the first support frame. In some implementations, for each pair of neighboring support frames, a second side of the triangular support member is coupled to a second support frame of the pair of neighboring support frames. In some implementations, the second side of the triangular support member has a width that is at least ¾ of a width of the second support frame.

In some implementations, each triangular support member defines an inner bore.

In some implementations, for each pair of neighboring support frames, the triangular support member is one of multiple triangular support members disposed between the pair of neighboring support frames and distributed along the length of the central rod. In some implementations, each of the triangular support members are coupled to the central rod and to each of the neighboring support frames.

In some implementations, each of the support frames are porous.

Certain aspects of the subject matter described can be implemented as a system for sorbent regeneration. The system includes a gas dehydrator and a filter. The gas dehydrator includes a sorbent. The filter is downstream of the gas dehydrator. The filter includes a base, a central rod, support frames, and a filter screen. The central rod is coupled to the base and defines a longitudinal axis of the filter. Each of the support frames are coupled to and protrude radially from the central rod. Each of the support frames are coupled to the base. For each pair of neighboring support frames, the filter includes a triangular support member disposed between the pair of neighboring support frames. Each triangular member is coupled to the central rod and to each of the neighboring support frames. The filter screen surrounds the support frames and is coupled to the support frames and to the base.

This, and other aspects, can include one or more of the following features.

In some implementations, each of the support frames have a height that is substantially the same as a length of the central rod.

In some implementations, for each pair of neighboring support frames, a first side of the triangular support member is coupled to a first support frame of the pair of neighboring support frames. In some implementations, the first side of the triangular support member has a width that is at least ¾ of a width of the first support frame. In some implementations, for each pair of neighboring support frames, a second side of the triangular support member is coupled to a second support frame of the pair of neighboring support frames. In some implementations, the second side of the triangular support member has a width that is at least ¾ of a width of the second support frame.

In some implementations, each triangular support member defines an inner bore.

In some implementations, for each pair of neighboring support frames, the triangular support member is one of multiple triangular support members disposed between the pair of neighboring support frames and distributed along the length of the central rod. In some implementations, each of the triangular support members are coupled to the central rod and to each of the neighboring support frames.

In some implementations, each of the support frames are porous.

Certain aspects of the subject matter described can be implemented as a method. A gas stream is flowed through a gas dehydrator including a sorbent. The gas stream has an operating temperature at which water desorbs from the sorbent, thereby regenerating the sorbent. After flowing the gas stream through the gas dehydrator, the gas stream is flowed through a filter. The filter includes a base, a central rod, support frames, and a filter screen. The central rod is coupled to the base and defines a longitudinal axis of the filter. Each of the support frames are coupled to and protrude radially from the central rod. Each of the support frames are coupled to the base. For each pair of neighboring support frames, the filter includes a triangular support member disposed between the pair of neighboring support frames. Each triangular member is coupled to the central rod and to each of the neighboring support frames. The filter screen surrounds the support frames and is coupled to the support frames and to the base. Flowing the gas stream through the filter includes flowing the gas stream through the filter screen radially inward toward the central rod.

This, and other aspects, can include one or more of the following features.

In some implementations, flowing the gas stream through the filter includes flowing the gas stream out of the filter through the base.

In some implementations, each of the support frames have a height that is substantially the same as a length of the central rod.

In some implementations, for each pair of neighboring support frames, a first side of the triangular support member is coupled to a first support frame of the pair of neighboring support frames. In some implementations, the first side of the triangular support member has a width that is at least ¾ of a width of the first support frame. In some implementations, for each pair of neighboring support frames, a second side of the triangular support member is coupled to a second support frame of the pair of neighboring support frames. In some implementations, the second side of the triangular support member has a width that is at least ¾ of a width of the second support frame.

In some implementations, each triangular support member defines an inner bore. In some implementations, flowing the gas stream through the filter includes flowing at least a portion of the gas stream through an inner bore of at least one of the triangular support members.

In some implementations, for each pair of neighboring support frames, the triangular support member is one of multiple triangular support members disposed between the pair of neighboring support frames and distributed along the length of the central rod. In some implementations, each of the triangular support members are coupled to the central rod and to each of the neighboring support frames.

In some implementations, each of the support frames are porous. In some implementations, flowing the gas stream through the filter includes flowing at least a portion of the gas stream through at least one of the support frames.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes filtration, and in particular, in relation to gas dehydration. Gas dehydration can include the use of a sorbent. As gas flows past the sorbent, water adsorbs to the sorbent, thereby dehydrating the gas. After some use, the sorbent needs to be regenerated. Sorbent regeneration can include heating the sorbent, so that the water desorbs from the sorbent, thereby regenerating the sorbent for re-use. During the regeneration process of the sorbent, dust can be generated. The dust is captured using a filter. The filter is reinforced with support frames and stiffeners in the form of triangular support members. The stiffeners are coupled to the support frames. The stiffeners can be distributed circumferentially around a central rod and in between neighboring support frames. The stiffeners can also be distributed along a longitudinal length of the central rod. The subject matter described in this disclosure can be implemented in particular implementations, so as to realize one or more of the following advantages. The filter described in this disclosure can be more durable and operate for an extended period of time in comparison to conventional filters. The filter described in this disclosure can mitigate the risk of solid material breakthrough, thereby protecting downstream equipment and in some cases, extending the operating life of downstream equipment. For example, mitigating the risk of solid material breakthrough also mitigates the risk of fouling in downstream heat exchangers, which hinders heat transfer. The configuration of the disclosed filter allows for even distribution of gas flowing through the filter. The filter screen can be easily removed in the case that its central rod and/or supporting members get damaged.

Figure 1A:
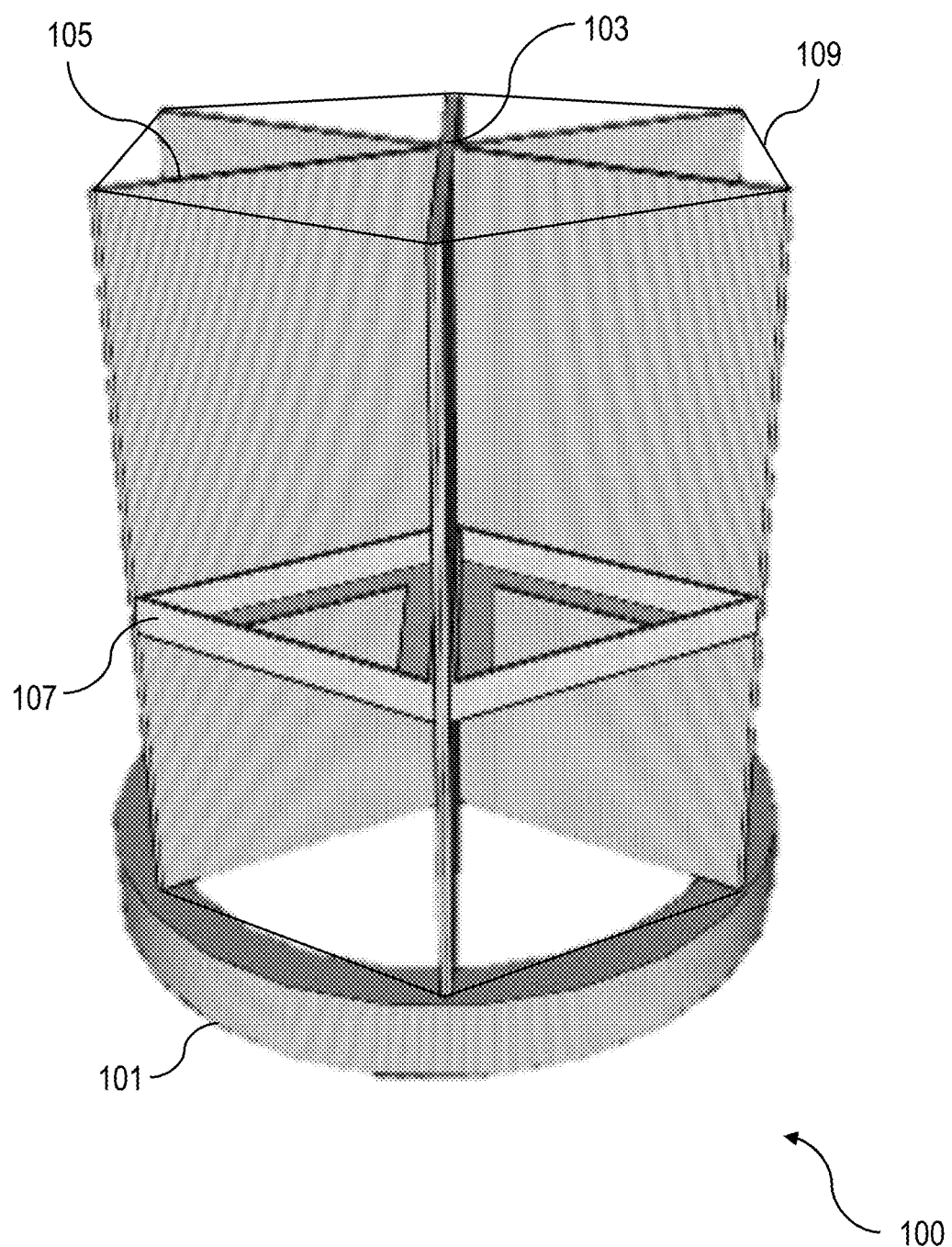
FIG. 1A is a schematic diagram of an example filter.

FIG. 1A is a schematic diagram of an implementation of a filter 100. The filter 100 includes a base 101, a central rod 103, and support frames 105. The central rod 103 is coupled to the base 101. The central rod 103 defines a longitudinal axis of the filter 100. Each of the support frames 105 are coupled to the base 101 and to the central rod 103. Each of the support frames 105 protrude radially from the central rod 103. In some implementations, the base 101 has a hexagonal shape. In some implementations, the base 101 has a circular shape. In some implementations, the base 101 defines an inner bore. The base 101 can be made, for example, of stainless steel (such as grade 304 stainless steel (SS), grade 304L SS, grade 316 SS, or grade 316L SS). In some implementations, at least one of the support frames 105 has a height that is substantially the same as a length of the central rod 103. In some implementations, each support frame 105 has a height that is substantially the same as the length of the central rod 103. In some implementations, at least one of the support frames 105 is porous. In some implementations, each support frame 105 is porous. The support frames 105 can be made, for example, of stainless steel (such as grade 304 SS, grade 304L SS, grade 316 SS, or grade 316L SS).

The filter 100 includes triangular support members 107. Each triangular support member 107 is disposed between neighboring support frames 105. Each triangular support member 107 is coupled to the neighboring support frames 105 between which the respective triangular support member 107 is disposed. In some implementations, at least one of the triangular support members 107 is coupled to the central rod 103. In some implementations, each triangular support member 107 is coupled to the central rod 103. In some implementations, at least one of the triangular support members 107 is coupled to the base 101. In some implementations, at least one of the triangular support members 107 defines an inner bore. In some implementations, each triangular support member 107 defines an inner bore. In some implementations, each triangular support member 107 includes multiple layers (for example, two or three layers). The triangular support members 107 can be made, for example, of stainless steel (such as grade 304 SS, grade 304L SS, grade 316 SS, or grade 316L SS).

The filter 100 includes a filter screen 109 surrounding the support frames 105. The filter screen 109 is coupled to the support frames 105. In some implementations, the filter screen 109 is coupled to the base 101. In some implementations, the filter screen 109 is a mesh screen defining perforations sized to filter dust particles from a gas stream flowing through the filter screen 109.

Figure 1B:
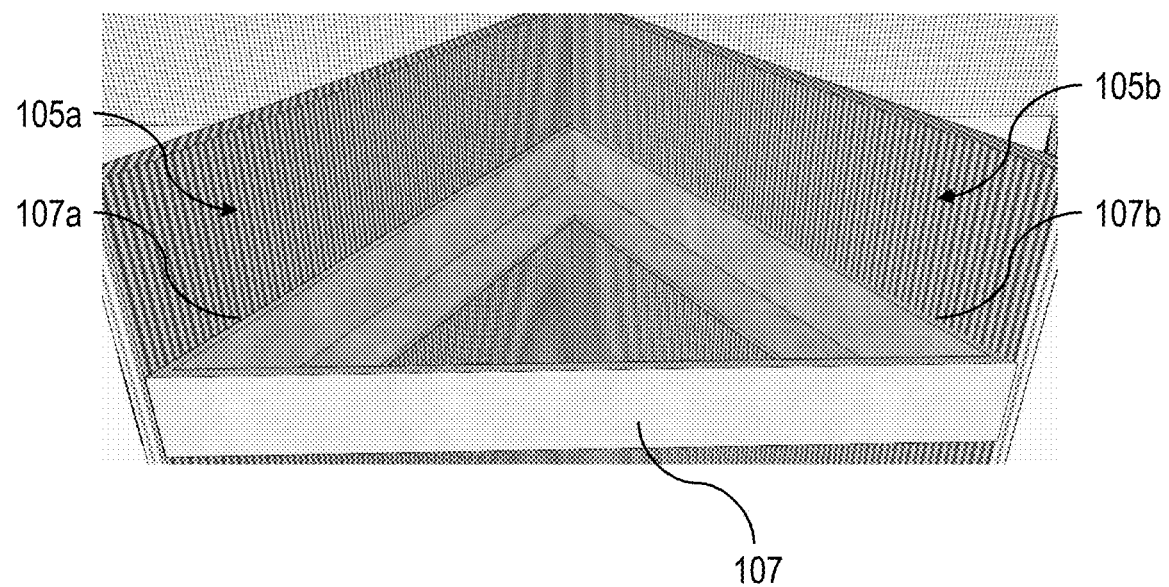
FIG. 1B is an enlarged view of a support member of the filter of FIG. 1A.

FIG. 1B is an enlarged view of the triangular support member 107. A first support frame 105a and a second support frame 105b are a pair of neighboring support frames. A first side 107a of the triangular support member 107 is coupled to the first support frame 105a. A second side 107b of the triangular support member 107 is coupled to the second support frame 105b. In some implementations, the first side 107a of the triangular support member 107 has a width that is at least ¾ of a width of the first support frame 105a to which the first side 107a is coupled. In some implementations, the second side 107b of the triangular support member 107 has a width that is at least ¾ of a width of the second support frame 105b to which the second side 107b is coupled.

Figure 1C:
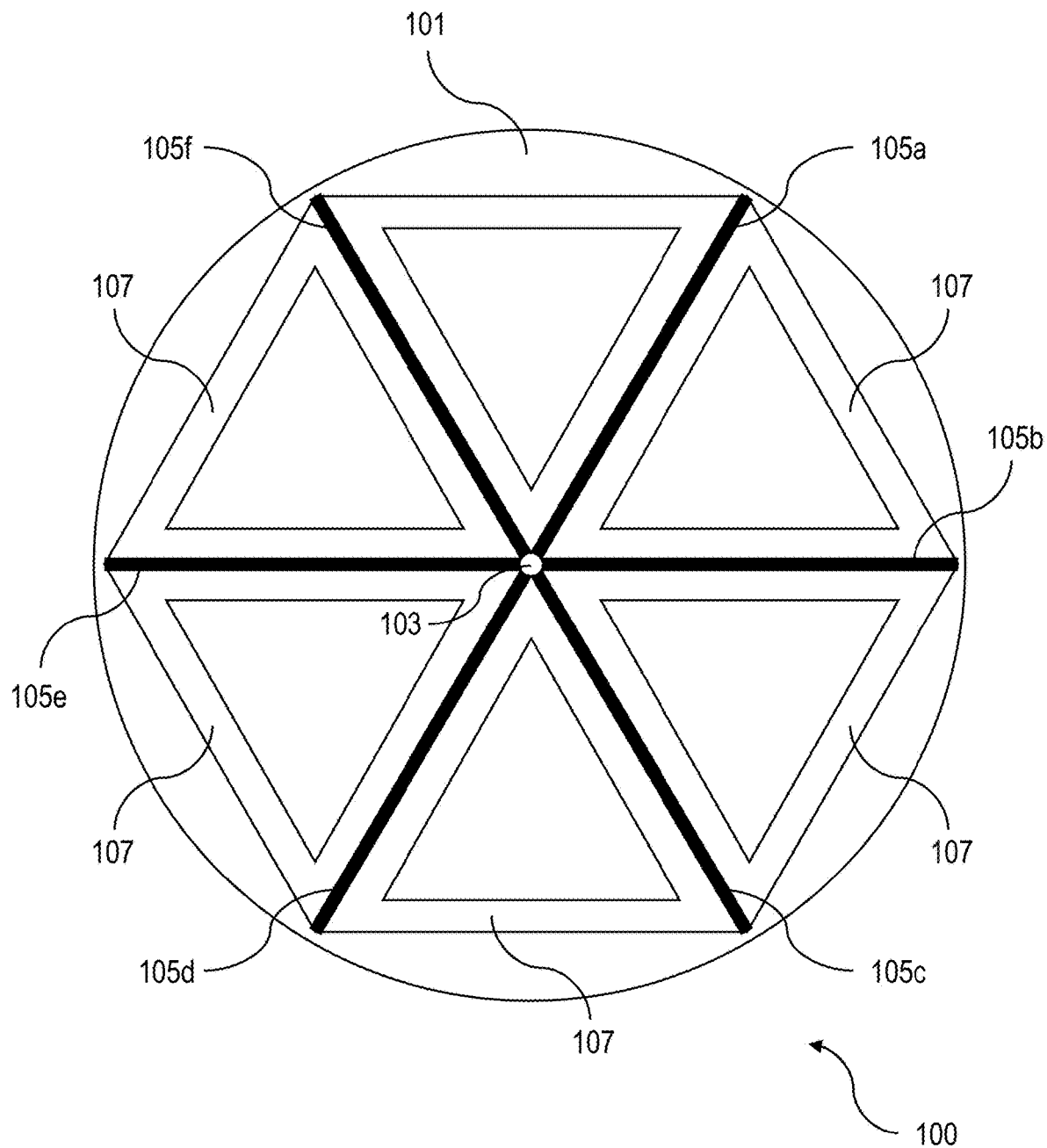
FIG. 1C is a top view of an example filter.

FIG. 1C is a top view of an implementation of the filter 100. In some implementations, the filter 100 includes six support frames 105 distributed around the central rod 103. In FIG. 1C, individual support frames are labeled with a subsequent letter (105a, 105b, 105c, 105d, 105e, and 105f). Support frames 105a and 105b can be considered a pair of neighboring support frames. Support frames 105b and 105c can be considered a pair of neighboring support frames. Support frames 105c and 105d can be considered a pair of neighboring support frames. Support frames 105d and 105e can be considered a pair of neighboring support frames. Support frames 105e and 105f can be considered a pair of neighboring support frames. Support frames 105f and 105a can be considered a pair of neighboring support frames. Although shown as including six support frames 105 distributed around the central rod 103, the filter 100 can include fewer support frames 105 (for example, five, four, or three) or additional support frames 105 (for example, seven, eight, or more than eight).

Figure 1D:
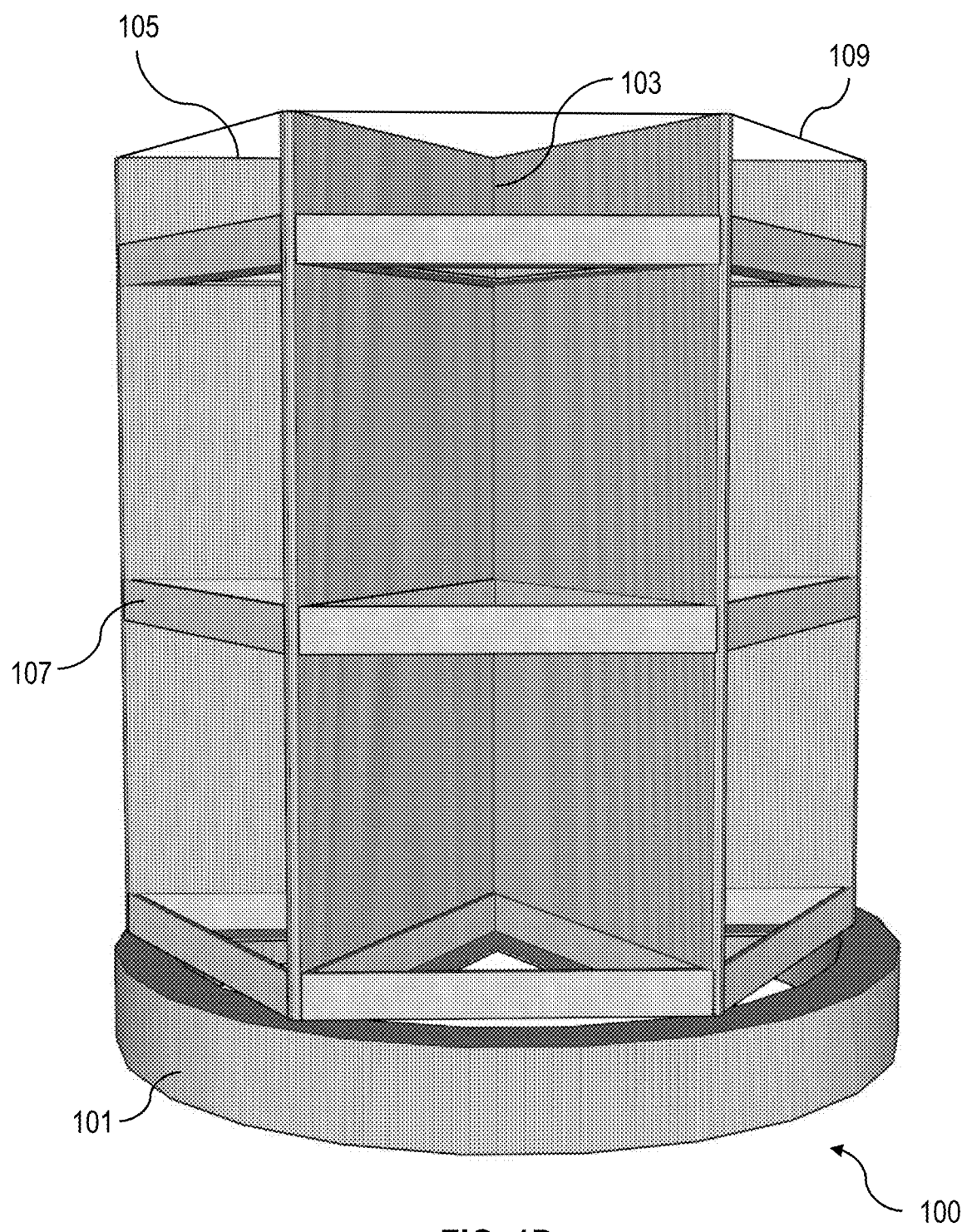
FIG. 1D is a schematic diagram of an example filter.
Figure 1E:
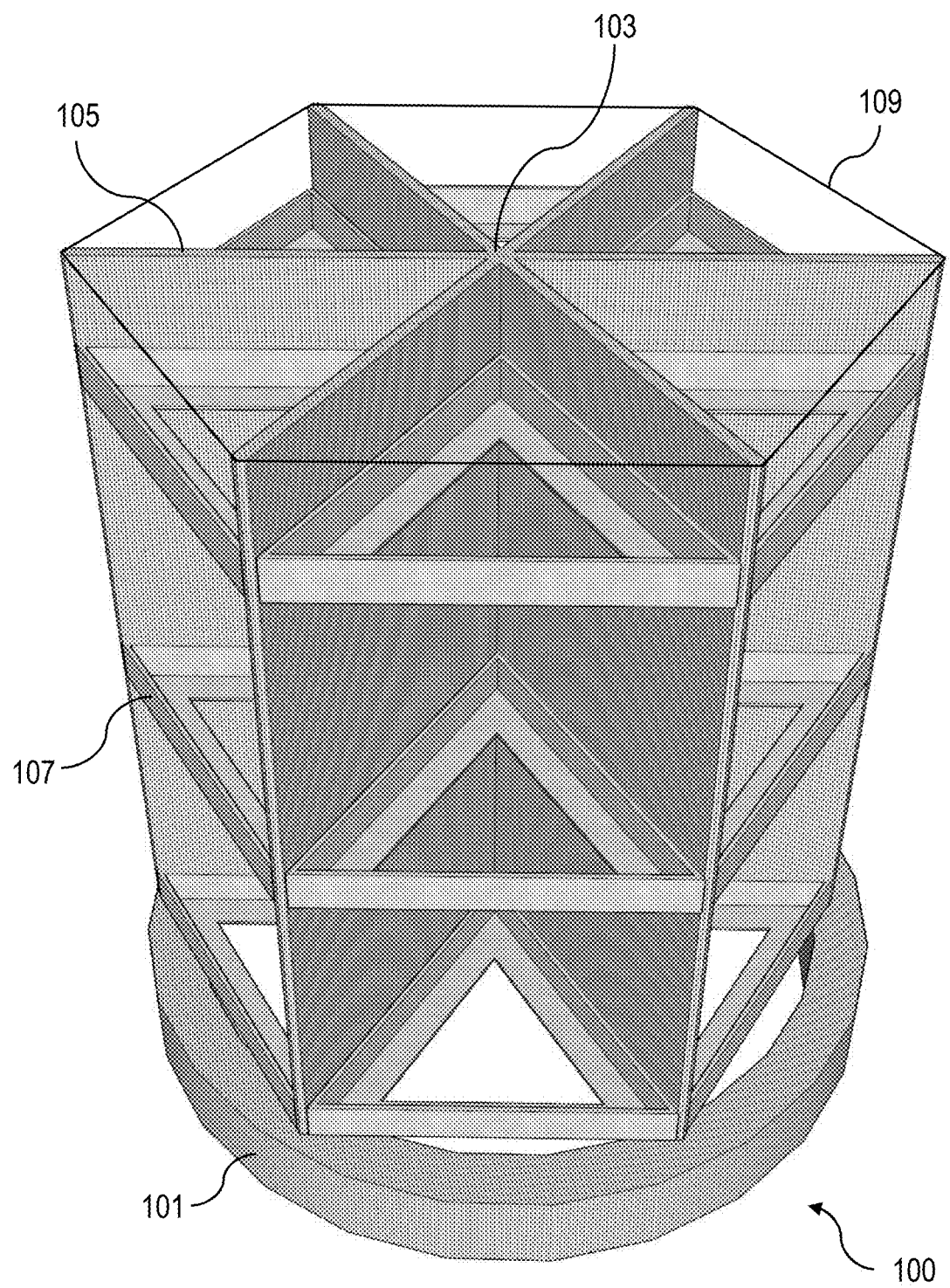
FIG. 1E is a schematic diagram of an example filter.

FIGS. 1D and 1E are different views of an implementation of the filter 100. In some implementations, multiple triangular support members 107 are disposed between a pair of neighboring support frames 105. In some implementations, multiple triangular support members 107 are disposed between each pair of neighboring support frames 105. The triangular support members 107 can be distributed along the length of the central rod 103. Each of the triangular support members 107 can be coupled to the central rod 103 and to each of the neighboring support frames 105.

Figure 2A:
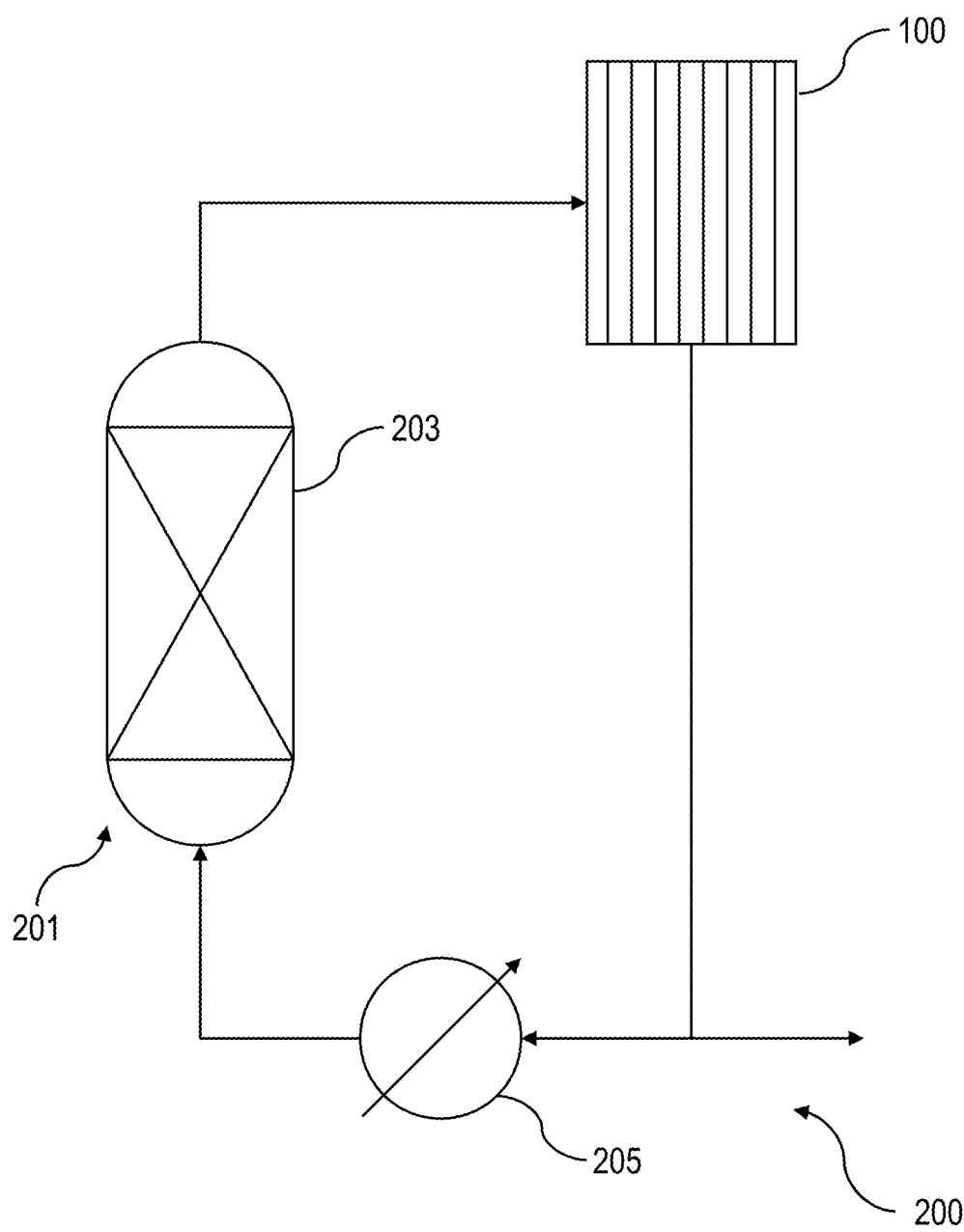
FIG. 2A is a schematic diagram of an example gas dehydration system.

FIG. 2A is a schematic diagram of an implementation of a gas dehydration system 200 that includes the filter 100. The system 200 includes a gas dehydrator 201, which includes a sorbent 203. In some implementations, the sorbent 203 is provided in the gas dehydrator 201 as a molecular sieve. As a gas stream flows through the gas dehydrator 201, water present in the gas stream adsorbs to the sorbent 203. Therefore, as the gas stream flows through the gas dehydrator 201, the gas stream is dehydrated. The sorbent 203 can be regenerated by heating the sorbent 203. Heating the sorbent 203 causes the water to desorb from the sorbent 203, thereby regenerating the sorbent 203, such that the sorbent 203 can be re-used for gas dehydration. In some implementations, heating the sorbent 203 includes flowing a heated gas stream through the gas dehydrator 201. Regenerating the sorbent 203 can produce dust. The filter 100 is used to remove the produced dust to protect downstream equipment.

In some implementations, the filter 100 is downstream of the gas dehydrator 201. The heated gas stream used to heat the sorbent 203 (to regenerate the sorbent 203) flows to the filter 100. As the heated gas stream flows through the filter 100, the filter 100 captures at least a portion of the dust and/or other solid material in the heated gas stream. The filtered gas stream flows out of the filter 100. In some implementations, the filtered gas stream is re-heated (for example, by heater 205) and recycled to the gas dehydrator 201 to continue regenerating the sorbent 203.

Figure 2B:
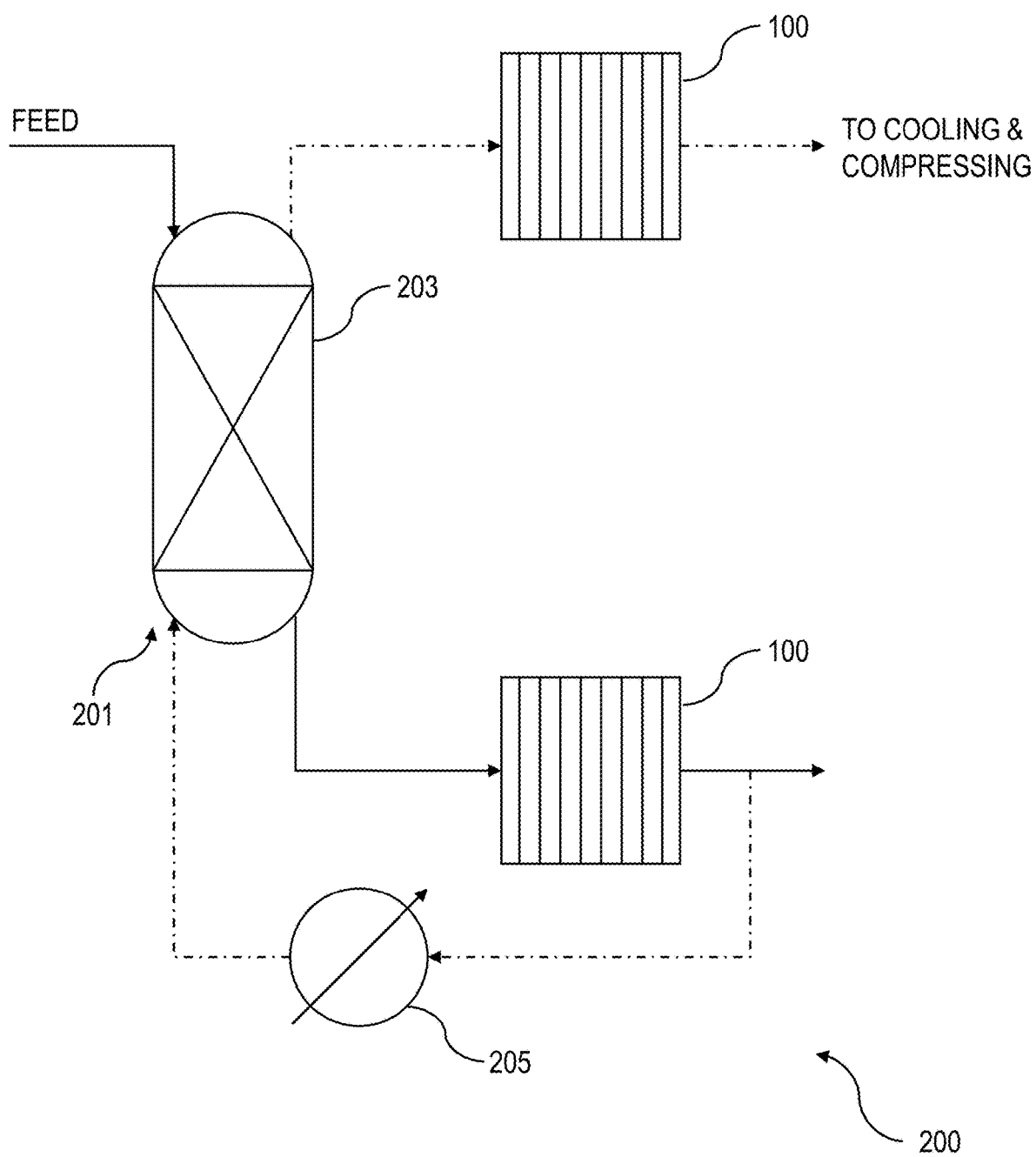
FIG. 2B is a schematic diagram of an example gas dehydration system.

FIG. 2B is a schematic diagram of an implementation of a gas dehydration system 200 that includes the filter 100. As shown in FIG. 2B, in some implementations, the gas dehydration system 200 includes multiple implementations of the filter 100 (for example, two filters 100). In some implementations, a portion of the filtered gas stream exiting the first filter (also referred to as a slip stream) is re-heated and recycled to the gas dehydrator 201 to regenerate the sorbent 203. In some implementations, the slip stream (after it has flowed through the gas dehydrator 201 to regenerate the sorbent 203) is flowed through the second filter, so that at least a portion of the dust and/or other solid material in the slip stream is captured. In some implementations, the filtered gas stream exiting the second filter is cooled and compressed.

Figure 3A:
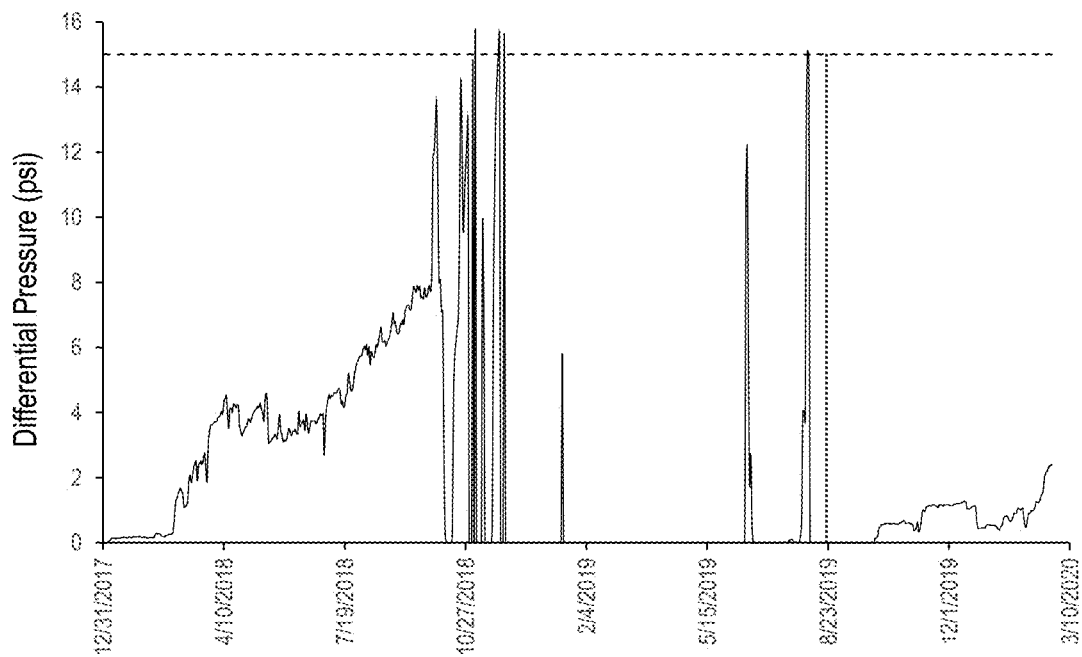
FIG. 3A is a plot of differential pressure data across a filter over time.
Figure 3B:
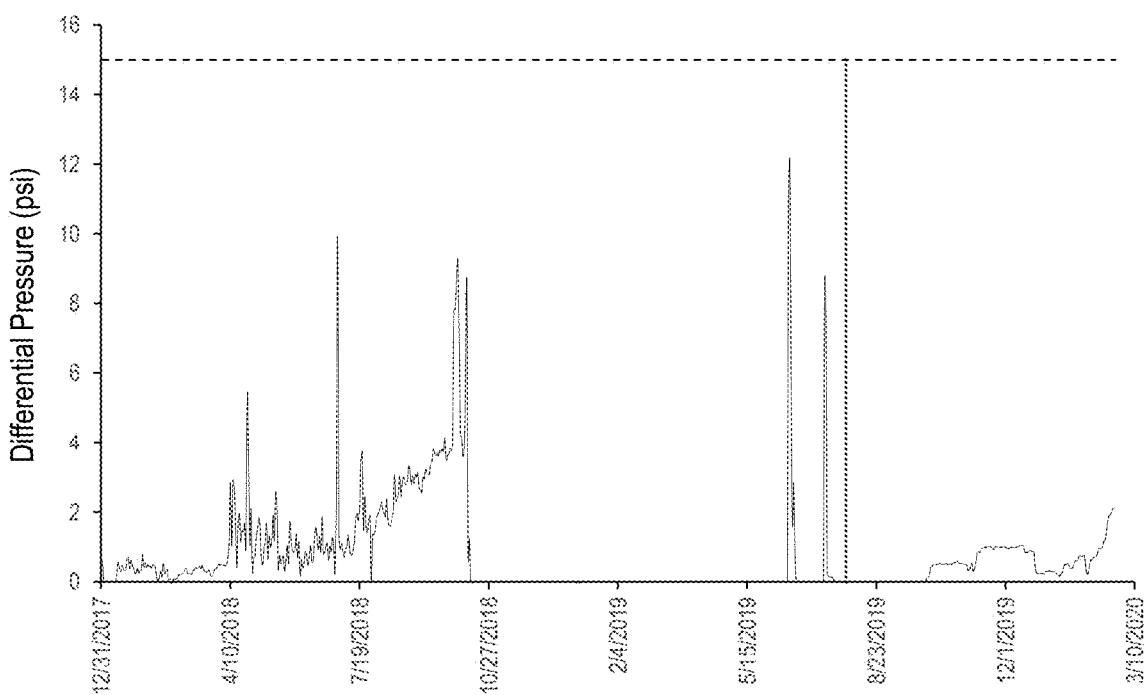
FIG. 3B is a plot of differential pressure data across a filter over time.

FIG. 3A is a plot of differential pressure across a filter over time. The horizontal dotted line represents the maximum differential pressure rating of the filter, 15 pounds per square inch (psi). The vertical dotted line represents the time at which an implementation of the filter 100 (Filter 1A) was installed. The data to the left of the vertical dotted line is attributed to a conventional filter different from the filter 100, while the data to the right of the vertical dotted line is attributed to an implementation of the filter 100 (Filter 1A). FIG. 3B is a plot of differential pressure across a filter over time. The vertical dotted line represents the time at which an implementation of the filter 100 (Filter 1B) was installed. The data to the left of the vertical dotted line is attributed to a conventional filter different from the filter 100, while the data to the right of the vertical dotted line is attributed to an implementation of the filter 100 (Filter 1B).

Figure 3C:
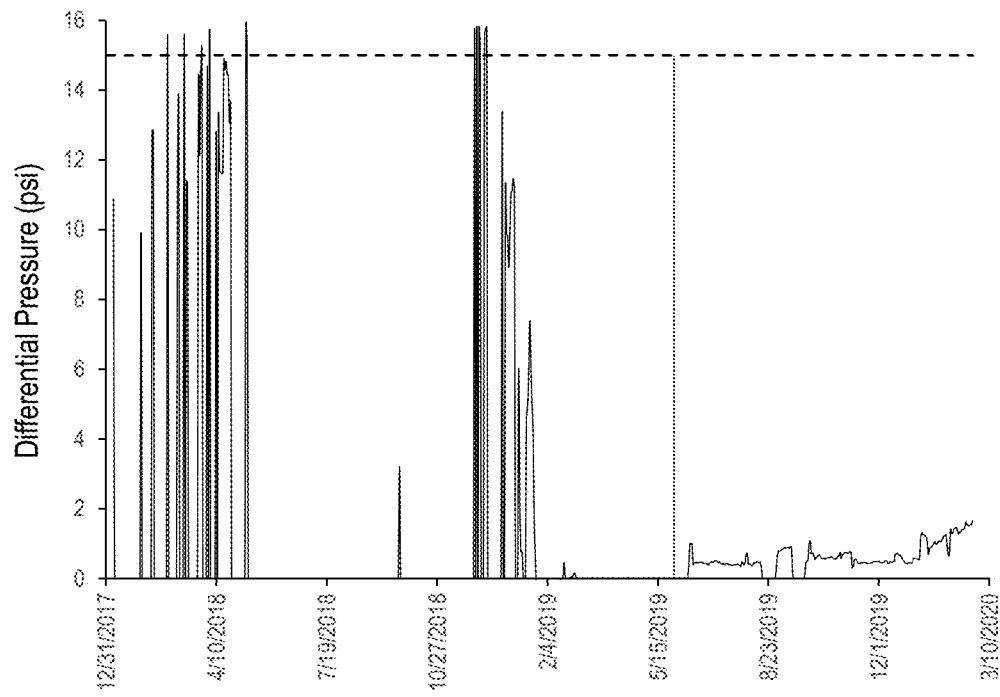
FIG. 3C is a plot of differential pressure data across a filter over time.
Figure 3D:
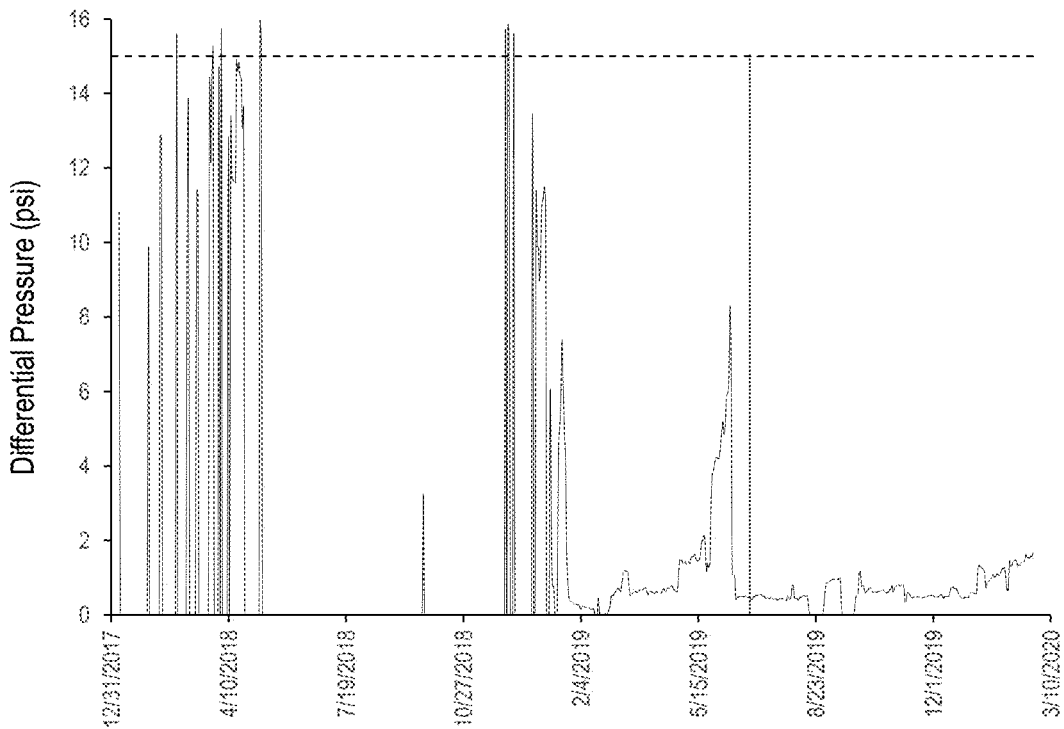
FIG. 3D is a plot of differential pressure data across a filter over time.

FIG. 3C is a plot of differential pressure across a filter over time. The horizontal dotted line represents the maximum differential pressure rating of the filter, 15 psi. The vertical dotted line represents the time at which an implementation of the filter 100 (Filter 2A) was installed. The data to the left of the vertical dotted line is attributed to a conventional filter different from the filter 100, while the data to the right of the vertical dotted line is attributed to an implementation of the filter 100 (Filter 2A). FIG. 3D is a plot of differential pressure across a filter over time. The vertical dotted line represents the time at which an implementation of the filter 100 (Filter 2B) was installed. The data to the left of the vertical dotted line is attributed to a conventional filter different from the filter 100, while the data to the right of the vertical dotted line is attributed to an implementation of the filter 100 (Filter 2B).

Figure 4:
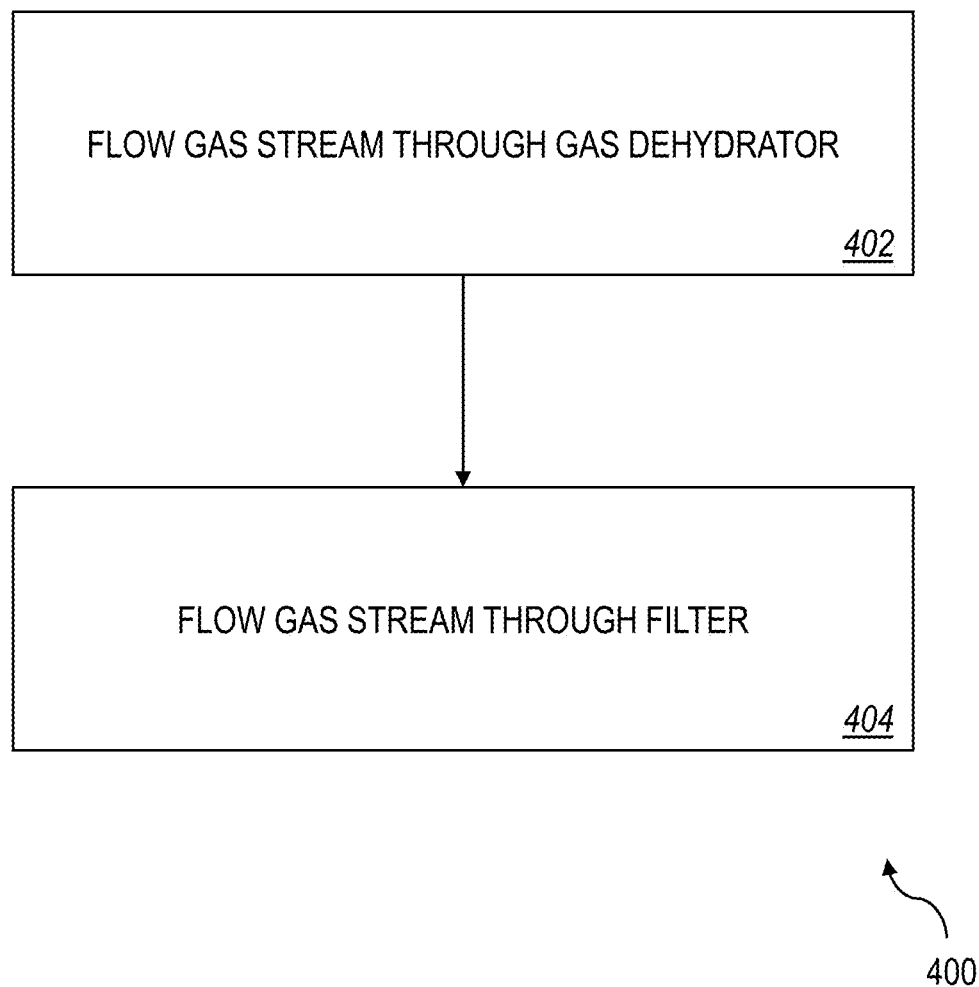
FIG. 4 is a flow chart of an example method for using a filter.

FIG. 4 is a flow chart of a method 400 for using a filter, such as the filter 100. The gas dehydration system 200 can be used, for example, to implement the method 400. At step 402, a gas stream is flowed through a gas dehydrator (such as the gas dehydrator 201) including a sorbent (such as the sorbent 203). The gas stream has an operating temperature at which water desorbs from the sorbent 203, thereby regenerating the sorbent 203 at step 402.

After flowing the gas stream through the gas dehydrator 201 at step 402, the gas stream is flowed through a filter (such as the filter 100) at step 404. Flowing the gas stream through the filter 100 at step 404 results in at least a portion of dust present in the gas stream to be removed from the gas stream. Therefore, flowing the gas stream through the filter 100 at step 404 results in solid filtering of the gas stream. Flowing the gas stream through the filter 100 at step 404 includes flowing the gas stream through the filter screen 109 radially inward toward the central rod 103.

In some implementations, flowing the gas stream through the filter 100 at step 404 includes flowing the gas stream out of the filter 100 through the base 101 (for example, through the inner bore of the base 101). In some implementations, flowing the gas stream through the filter 100 at step 404 includes flowing at least a portion of the gas stream through the inner bore of at least one of the triangular support members 107. In some implementations, flowing the gas stream through the filter 100 at step 404 includes flowing at least a portion of the gas stream through at least one of the support frames 105 (for example, in implementations where at least one of the support frames 105 is porous). In some implementations, after the gas stream is flowed through the filter 100 at step 404, the gas stream is heated and recycled to the gas dehydrator 201, such that the method 400 can be repeated at step 402.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the term "neighboring" refers to components that are adjacent to one another. For example, two support frames 105 are considered to be a pair of neighboring support frames if they are adjacent to one another and are not separated by another support frame. For example, referring back to FIG. 1C, support frames 105a and 105b can be considered neighboring support frames, and support frames 105a and 105c are not considered neighboring support frames because support frame 105b is disposed between support frames 105a and 105c.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A filter for a sorbent regeneration process, the filter comprising:
a base;
a central rod coupled to the base, the central rod defining a longitudinal axis of the filter;
a plurality of support frames, each of the support frames coupled to and protruding radially from the central rod, each of the support frames coupled to the base;
for each pair of neighboring support frames, at least one triangular support member is disposed between the pair of neighboring support frames, the triangular support member coupled to the central rod and to each of the neighboring support frames; and
a filter screen surrounding the plurality of support frames, the filter screen coupled to the plurality of support frames and to the base.

2. The filter of claim 1, wherein each of the support frames have a height that is substantially the same as a length of the central rod.

3. The filter of claim 2, wherein for each pair of neighboring support frames:
- a first side of the triangular support member is coupled to a first support frame of the pair of neighboring support frames;
- the first side of the triangular support member has a width that is at least ¾ of a width of the first support frame;
- a second side of the triangular support member is coupled to a second support frame of the pair of neighboring support frames; and
- the second side of the triangular support member has a width that is at least ¾ of a width of the second support frame.

4. The filter of claim 3, wherein each triangular support member defines an inner bore.

5. The filter of claim 4, wherein for each pair of neighboring support frames, a plurality of triangular support members are disposed between the pair of neighboring support frames and distributed along the length of the central rod, each of the triangular support members coupled to the central rod and to each of the neighboring support frames.

6. The filter of claim 5, wherein each of the support frames are porous.

7. A system for sorbent regeneration, the system comprising:
- a gas dehydrator comprising a sorbent; and
- a filter downstream of the gas dehydrator, the filter comprising:
  - a base;
  - a central rod coupled to the base, the central rod defining a longitudinal axis of the filter;
  - a plurality of support frames, each of the support frames coupled to and protruding radially from the central rod, each of the support frames coupled to the base;
  - for each pair of neighboring support frames, at least one triangular support member is disposed between the pair of neighboring support frames, the triangular support member coupled to the central rod and to each of the neighboring support frames; and
  - a filter screen surrounding the plurality of support frames, the filter screen coupled to the plurality of support frames and to the base.

8. The system of claim 7, wherein each of the support frames have a height that is substantially the same as a length of the central rod.

9. The system of claim 8, wherein for each pair of neighboring support frames:
- a first side of the triangular support member is coupled to a first support frame of the pair of neighboring support frames;
- the first side of the triangular support member has a width that is at least ¾ of a width of the first support frame;
- a second side of the triangular support member is coupled to a second support frame of the pair of neighboring support frames; and
- the second side of the triangular support member has a width that is at least ¾ of a width of the second support frame.

10. The system of claim 9, wherein each triangular support member defines an inner bore.

11. The system of claim 10, wherein for each pair of neighboring support frames, a plurality of triangular support members are disposed between the pair of neighboring support frames and distributed along the length of the central rod, each of the triangular support members coupled to the central rod and to each of the neighboring support frames.

12. The system of claim 11, wherein each of the support frames are porous.

13. A method comprising:
- flowing a gas stream through a gas dehydrator comprising a sorbent, wherein the gas stream has an operating temperature at which water desorbs from the sorbent, thereby regenerating the sorbent; and
- after flowing the gas stream through the gas dehydrator, flowing the gas stream through a filter, the filter comprising:
  - a base;
  - a central rod coupled to the base, the central rod defining a longitudinal axis of the filter;
  - a plurality of support frames, each of the support frames coupled to and protruding radially from the central rod, each of the support frames coupled to the base;
  - for each pair of neighboring support frames, at least one triangular support member is disposed between the pair of neighboring support frames, the triangular support member coupled to the central rod and to each of the neighboring support frames; and
  - a filter screen surrounding the plurality of support frames, the filter screen coupled to the plurality of support frames and to the base, wherein flowing the gas stream through the filter comprises flowing the gas stream through the filter screen radially inward toward the central rod.

14. The method of claim 13, wherein flowing the gas stream through the filter comprises flowing the gas stream out of the filter through the base.

15. The method of claim 14, wherein each of the support frames have a height that is substantially the same as a length of the central rod.

16. The method of claim 15, wherein for each pair of neighboring support frames:
- a first side of the triangular support member is coupled to a first support frame of the pair of neighboring support frames;
- the first side of the triangular support member has a width that is at least ¾ of a width of the first support frame;
- a second side of the triangular support member is coupled to a second support frame of the pair of neighboring support frames; and
- the second side of the triangular support member has a width that is at least ¾ of a width of the second support frame.

17. The method of claim 16, wherein each triangular support member defines an inner bore, and flowing the gas stream through the filter comprises flowing at least a portion of the gas stream through the inner bore of at least one of the triangular support members.

18. The method of claim 17, wherein for each pair of neighboring support frames, a plurality of triangular support members are disposed between the pair of neighboring support frames and distributed along the length of the central rod, each of the triangular support members coupled to the central rod and to each of the neighboring support frames.

19. The method of claim 18, wherein each of the support frames are porous, and flowing the gas stream through the filter comprises flowing at least a portion of the gas stream through at least one of the support frames.

* * * * *